US006438468B1

(12) United States Patent
Muxlow et al.

(10) Patent No.: US 6,438,468 B1
(45) Date of Patent: Aug. 20, 2002

(54) SYSTEMS AND METHODS FOR DELIVERING DATA UPDATES TO AN AIRCRAFT

(75) Inventors: Dan Muxlow, Phoenix; Lisa A. Mueller, Cave Creek; Stephen Earl Mead, Peoria, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/724,228

(22) Filed: Nov. 28, 2000

(51) Int. Cl.[7] .................................................. G05D 1/00
(52) U.S. Cl. ............................... 701/3; 701/29; 701/32; 701/33; 701/36
(58) Field of Search ............................ 701/1, 3, 29, 31, 701/32, 33, 35, 36; 340/425.5, 5.8

(56) References Cited

U.S. PATENT DOCUMENTS 5,917,405 A * 6/1999 Joao ............................ 701/36
6,154,637 A * 11/2000 Wright et al. ................. 701/35
6,160,998 A * 12/2000 Wright et al. ................. 701/29
6,163,681 A * 12/2000 Wright et al. ................. 701/35
6,167,238 A * 12/2000 Wright ......................... 701/29
6,167,239 A * 12/2000 Wright et al. ................. 701/29
6,173,159 B1 * 1/2001 Wright et al. ................. 701/35

* cited by examiner

*Primary Examiner*—Richard M. Camby

(57) ABSTRACT

Systems and methods for providing data updates to a vehicle component (such as a navigation database on an aircraft) make use of a system server, a vehicle server, and an administrative program. The system server is configured to receive and store said data updates from a source. The vehicle server obtains data updates from the system server and loads the data updates into the appropriate component. In various embodiments, the aircraft server sends a verification message to the system server to indicate success or failure of the load operation. An administrative program may be configured to direct the system server to provide said data updates to the vehicle server in accordance with predetermined rules, and a database may be used to maintain information about data upgrades for various vehicles.

15 Claims, 6 Drawing Sheets

SYSTEMS AND METHODS FOR DELIVERING DATA UPDATES TO AN AIRCRAFT

FIELD OF THE INVENTION

Various embodiments of the present invention relate to aircraft data systems. More specifically, the present invention relates to systems and methods for delivering software and/or data updates to vehicles (such as aircraft) from remote locations.

BACKGROUND OF THE INVENTION

In recent years, the amount of automation and computerization present in vehicles (particularly aircraft) has increased dramatically. As pilots, drivers, passengers and others become increasingly dependent upon computerized devices to control, navigate or otherwise affect their craft, the need for current data becomes paramount. Aircraft navigation data, for example, typically includes navigation waypoint locations and frequencies, information about airports and airways, and the like, and this information changes frequently.

As aircraft move about the country or the world, it is very difficult for pilots to maintain accurate and timely information about the thousands of navigation data points that the pilot may encounter. Accordingly, many modern aircraft feature flight management systems (FMS) that make use of electronic databases (often referred to as a "navigation databases" or "NAV databases") that contains electronic records for the various airports and navigation aids that pilots may encounter. FMS systems are typically aircraft specific, and are available from a number of vendors such as Honeywell International Inc. of Phoenix, Ariz. Navigation database information is typically provided to an airline or other aircraft owner by an FMS supplier. Information used in formulating navigation databases may be obtained from a vendor such as Jeppesen Sanderson Inc. of Denver, Colo., a division of the Boeing Company.

As will be appreciated, the information contained in the navigation database changes on a very frequent basis as new navigation aids are created, old navigation aids are retired, airports add or retire runways, or the like. Accordingly, government agencies such as the United States Federal Aviation Administration (FAA) typically require that aircraft update navigation databases on a regular basis, such as every twenty-eight days. Other components (such as global positioning systems (GPS)) may also make use of periodic data upgrades.

Conventional techniques of updating databases have been cumbersome and time consuming. Typically, a customer (such as an airline) obtains a diskette containing the upgrade for a particular aircraft type from a database or component vendor. The customer then duplicates the diskette and distributes copied diskettes to service technicians, who then go to individual aircraft and manually load the data update using a specialized data loader, such as a Model PDL 615 portable data loader available from Demo Systems Division of Moorpark, Calif. It will be appreciated, then, that the process of duplicating, distributing and monitoring database upgrades places an administrative burden upon a database customer, particularly if the customer has a large fleet of aircraft. If the customer has multiple types of aircraft (e.g. Boeing 737-300, 737-400, MD-11 and 767 aircraft in addition to Airbus A-310 or A-320 aircraft), the administration becomes exponentially more difficult since each type of aircraft typically requires a separate navigation database.

Moreover, the process of loading the data from the diskette to the FMS or other relevant component takes time (e.g. about an hour per aircraft for navigation database updates) during which the aircraft is not able to function. As such, the amount of required down time for relatively frequent updates may have an impact in terms of lost revenue for the aircraft owner.

It would be desirable, then, to provide systems and methods for updating software or data for aircraft or other vehicles that would efficiently provide current data without requiring the administrative overhead typically associated with copying and distributing diskettes.

SUMMARY OF THE INVENTION

Systems and methods for providing data updates to a vehicle component (such as a navigation database on an aircraft) make use of a system server, a vehicle server, and an administrative program. The system server is configured to receive and store said data updates from a data source. The vehicle server obtains data updates from the system server and loads the data updates into the appropriate component. In various embodiments, the aircraft server sends a verification message to the system server to indicate success or failure of the load operation. An administrative program may be configured to direct the system server to provide said data updates to the vehicle server in accordance with pre-determined rules, and a database may be used to maintain information about data upgrades for various vehicles.

BRIEF DESCRIPTION OF THE DRAWING FIGURES

The above and other features and advantages of the present invention are hereinafter described in the following detailed description of illustrative embodiments to be read in conjunction with the accompanying drawing figures, wherein like reference numerals are used to identify the same or similar parts in the similar views, and:

DESCRIPTION OF EXEMPLARY EMBODIMENTS

Figure 1:
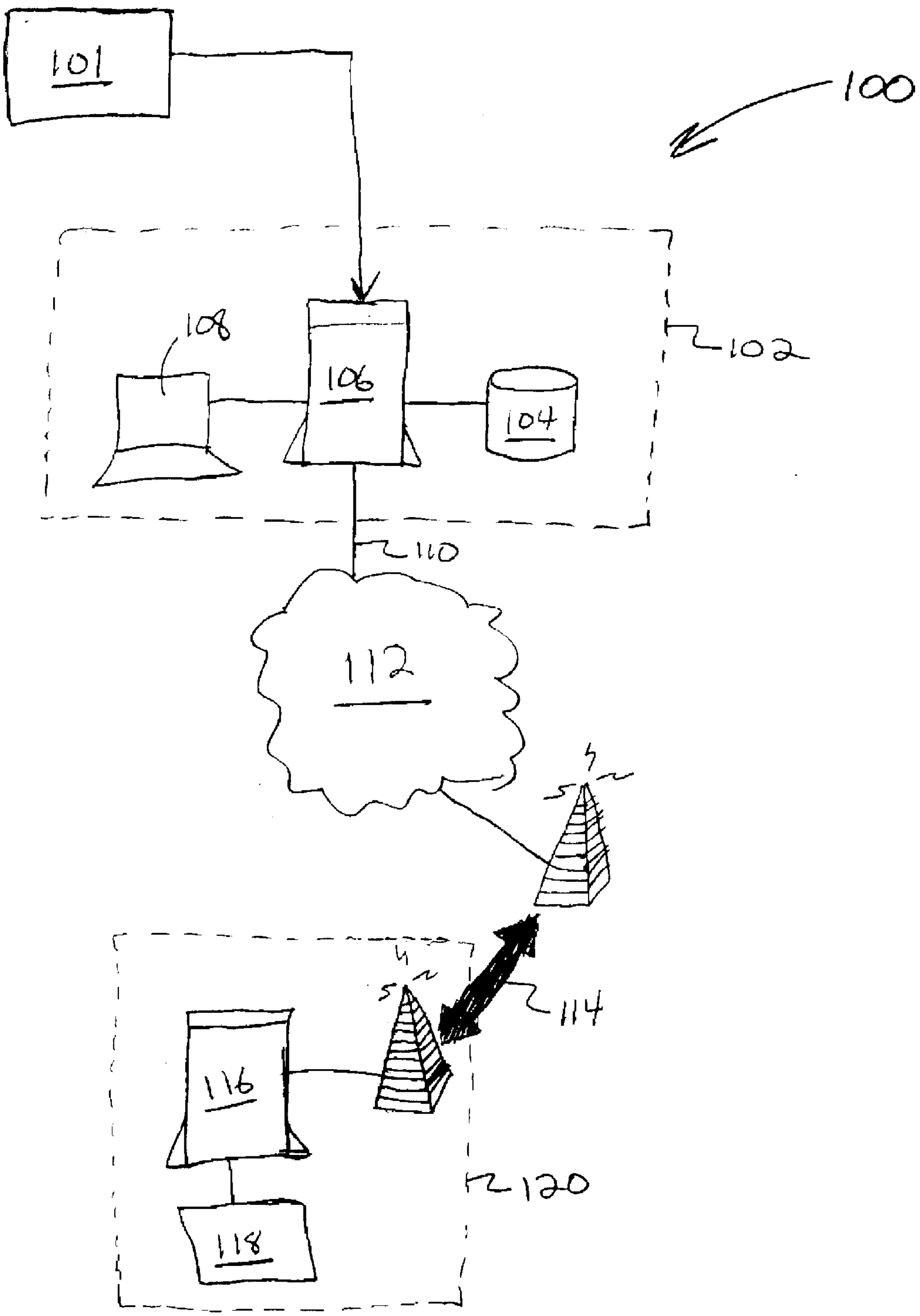
FIG. 1 is a block diagram of an exemplary system for delivering data updates to a vehicle.

The present invention may be described herein in terms of functional block components and various processing steps. It should be appreciated that such functional blocks may be realized by any number of hardware and/or software components or computer systems configured to perform the specified functions. For example, the present invention may employ various computer systems, e.g., personal computers, workstations, routers, gateways, and the like, which may carry out a variety of functions under the control of one or more microprocessors or other control devices. Similarly, the software elements of the present invention may be implemented with any programming or scripting languages such as C, C++, Java, Assembly Language, PERL, or the like, or any combination thereof, with the various algorithms being implemented with any combination of data structures, objects, processes, routines or other programming elements. Further, it should be noted that the present invention may employ any number of techniques for data transmission, signaling, data processing, network control, and the like.

It should be appreciated that the particular embodiments shown and described herein are illustrative of the invention and its best mode and are not intended to otherwise limit the scope of the invention in any way. Indeed, for the sake of brevity, conventional data networking, application development and other functional aspects of the systems (and components of the individual operating components of the systems) may not be described in detail. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical data delivery system.

To simplify the description of the exemplary embodiments, the invention is frequently described as pertaining to a system for delivering navigation database updates to an aircraft. It will be appreciated, however, that many applications of the present invention could be formulated. For example, the present invention could be used to provide any sort of electronic information or data to a vehicle. Such information may include software upgrades, updates, bug fixes or enhancements; database upgrades, additions or replacements; textual, graphical, audio/visual or other content that may be consumed in any medium; or any other sort of data. Similarly, the invention may be implemented with any sort of vehicle such as an airplane, helicopter, aircraft of any sort, boat, ship, bus, train, taxi, automobile, or the like. Further, although the invention is frequently described herein as being implemented with TCP/IP communications protocols, it will be readily understood that the invention could also be implemented using IPX, Appletalk, IP6, NETBIOS, OSI, or any number of existing or future protocols.

FIG. 1 is a block diagram of an exemplary system for delivering data updates to a vehicle. With reference now to FIG. 1, an exemplary system 100 suitably includes a system server 102 communicating via a data network 112 with a vehicle server 116 associated with a vehicle 120. Data updates may be any form of software, data or information that is to be provided to a component 118. Examples of data updates include executable files, database updates, multimedia content, or the like. In an exemplary embodiment, the data update includes a version of a navigation database such as that provided by Honeywell International Inc. of Phoenix, Ariz. to be installed in a flight management computer or flight management system, which are also available from Honeywell International Inc.

System server 102 suitably includes an administrative application/program 106, a database 104 and an interface application 108. Database 104 may be implemented with any hierarchical, relational, object-oriented or other database management program such as the database management products available from Sybase, Oracle, Microsoft, or other vendors. In various embodiments, database 104 maintains copies of data updates obtained from data source 101. Alternatively or in addition, database 104 maintains records of information about particular aircraft (or other vehicles 120) in conjunction with information about data updates running on or required by particular vehicles 120. In an exemplary embodiment, database 104 contains records for particular vehicles 120 sorted by one or more identifiers (such as aircraft tail numbers assigned by the FAA) in conjunction with aircraft type (e.g. 757-300, A320, MD-11, etc.), data update version currently in use, and a date that a new data update will be provided. Of course, alternate embodiments may include databases 104 with different or additional information or fields as appropriate.

Administrative application 106 is any computer program that is capable of controlling the operation of system server 102. In various embodiments, application 106 resides and executes on a computer such as a personal computer or workstation running the Windows NT, Windows 2000 or similar operating system available from the Microsoft Corporation of Redmond, Wash. In other embodiments, application 106 resides in a UNIX or LINUX environment, or on any other suitable computing platform. Functionality provided by application 106 varies from embodiment to embodiment, but may include obtaining data update files from a data source 101, processing incoming data update files, processing scheduled transmissions of data updates to particular vehicles, and cleaning up extra data update files in database 104. Additional detail about application 106 is provided below, particularly in conjunction with FIG. 3. A user interface application 108 may be provided to administrative application via any computer such as a personal computer, notebook computer, workstation, personal digital assistant, kiosk, browser or the like. In an exemplary embodiment, interface program 108 is provided via a personal computer with conventional input/output facilities such as a keyboard, mouse and monitor. Exemplary functions that may be carried out by interface application 108 include accepting user inputs from a user, formulating rules and/or schedules for providing data updates to particular vehicles, and providing reports based upon data stored in database 104.

The various components of system server 102 may be assembled in any manner. Database 104, application 106 and interface 108 may be provided on a single computer or workstation, for example. Alternatively, a data network could couple multiple computing resources to each other to provide the functionality of the various components.

System server 102 communicates with a vehicle server 116 associated with vehicle 120 via a data network 112. Data network 112 may be any communications network such as the internet, a corporate intranet or extranet, a satellite or telephone network, or any other digital communications medium. In various embodiments, vehicle 120 is digitally coupled to network 112 via a wireless communications link 114. Examples of wireless links include any forms of radio frequency (RF) links, infrared links, optical links and the like. In an exemplary embodiment, wireless link 114 is a link that is based upon the IEEE 802.11 standard for wireless local area networks (WLANs). Additional details about IEEE 802.11 communications in an aircraft environment are contained in ARINC Characteristic 763 dated December 1999, commonly called the "Gatelink Standard". An exemplary implementation of a gatelink device is shown in U.S. Pat. No. 6,047,165 issued on Apr. 4, 2000, the contents of which are hereby incorporated by reference. The IEEE 802.11 standard dated 1997 and the ARINC 763 standard dated December 1999 are also incorporated herein by reference in their entirety. Gatelink devices suitably allow aircraft (or other vehicles) to transmit via a wireless connection in the 2.4 gigahertz band reserved for industrial, scientific and medical uses. Gatelink transmissions generally take place over a relatively short distance, however, typically on the order of 400 meters or so. As such, gatelink base stations are typically located at airports or other locations where multiple aircraft 120 are likely to be found. As vehicles 120 come within range of a gatelink transceiver, data transmissions between the transceiver and the vehicle 120 are allowed as appropriate. Gatelink equipment is available from a number of vendors including the Harris Corporation of Palm Bay, Fla., Honeywell International Inc. of Phoenix, Ariz., and other companies such as Nokia, Lucent, etc.

Vehicle 120 (which may be an aircraft, spacecraft, watercraft, automobile, bus, taxi or any other vehicle) suitably includes a receiver for obtaining data via a data link 114, a vehicle server 116, and a component 118 that may be involved in the control or navigation of vehicle 120. An appropriate receiver may include a gatelink receiver as discussed above, or any other type of wireless, optical or electrical data connection. Vehicle server 116 is any hardware or software device that is capable of receiving data updates from system server 102 and loading the updates in component 118. In an exemplary embodiment, vehicle server 116 is a network server system as described by, for example, ARINC standard 763, previously incorporated by reference. The ARINC 763 network server system (NSS) description includes a common file server, data processing, mass storage and interface capabilities to a number of terminals connected via an onboard aircraft Local Area Network (LAN). The vehicle server 116 described therein is a central node through which terminals are able to communicate with avionics systems, access data and applications stored in the NSS mass memory storage, although of course other types of vehicle servers 116 could be formulated. Vehicle servers include, for example, the Total Aircraft Information System (TAIS) product available from Honeywell International Inc. of Phoenix, Ariz. Common functionality associated with such servers includes passenger email service, duty free shopping, credit card authentication, electronic books, cached web browsing, and the like. Data loading functionality may be accomplished with hardware and software available from, for example, ILC Data Service Corp. Such hardware and software may include, for example, ARINC 615 data loader software and/or an ILC 429 card available from ILC, or any other implementation of the ARINC 615 or other appropriate data loader protocols.

Component 118 is any avionics or other aircraft device such as a flight management computer (FMC), flight management system (FMS), global positioning system (GPS), navigation computer or the like. Such devices are available from Honeywell International Inc. of Phoenix, Ariz., and may be communicatively coupled to vehicle server 116 via any networking or cabling scheme. In various embodiments, component 118 suitably uses data upgrades from data source 101 to perform a function. Flight management systems, for example, use data upgrades to a navigation database to assist in flight planning.

Figure 2:
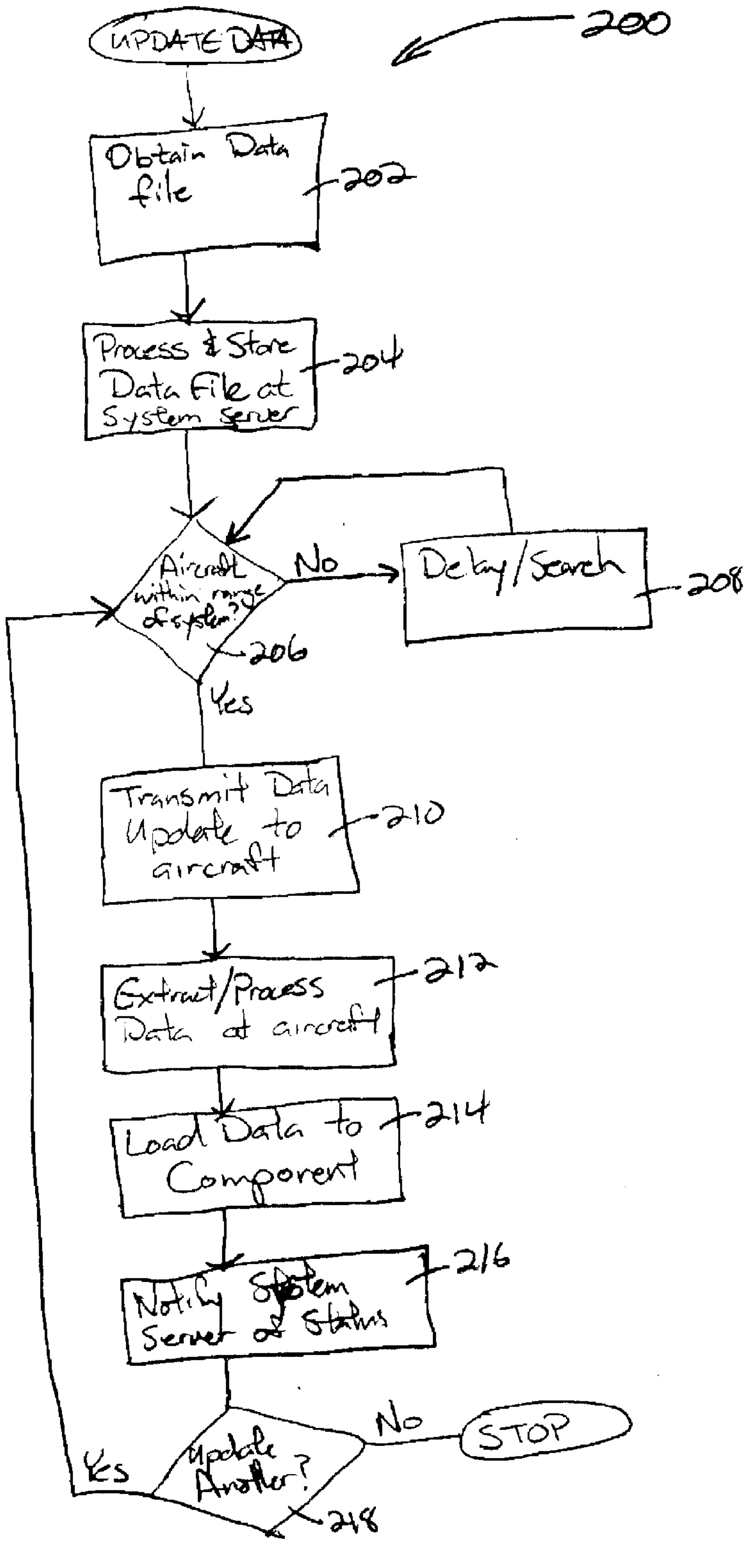
FIG. 2 is a flowchart of an exemplary method for delivering data updates to a vehicle.

FIG. 2 is a flowchart of an exemplary process for providing data updates from a data source 101 to a component 118. With reference now to FIG. 2, an exemplary process 200 suitably includes obtaining a data update file (step 202), processing the data update file at system server 102 (step 204), forwarding the data update to a vehicle (steps 206, 208, and 210), processing the data update at the vehicle (steps 212 and 214), and notifying system server 102 of the status of the data update load at component 118 (step 216).

System server 102 suitably receives data updates from a data source 101 via a digital network or other data connection (step 202). Data updates may be obtained by the file transfer protocol (FTP) or any other transfer technique. Alternatively, data updates are manually provided from data source 101 to administrative program 106 via diskette, CD-ROM, magnetic tape or any other appropriate medium that may be transported by hand, mail, courier or the like. Data update files that are received at system server 102 are suitably decompressed, decrypted or otherwise processed as appropriate to place the data update into a useable format that may be stored in server 102 (e.g. in database 104, on a hard drive, or elsewhere as appropriate) prior to distribution to a vehicle 120. Time of distribution to a particular vehicle may be determined by administrative program 106 in accordance with pre-determined rules based upon user inputs and data in database 104, for example, or according to any other scheme.

When the time to provide the update to a particular vehicle 120 arrives, application 106 suitably transmits the appropriate data update file to vehicle 120 via data network 112. If the vehicle is within range (e.g. present at an airport having a gatelink or other appropriate wireless system 114), the data file is sent to the vehicle. If the vehicle is out of range (steps 206 and 208), the data file is appropriately stored at a gatelink controller (not shown) or other source until the vehicle comes into range and establishes communication with an appropriate data link 114. Alternatively, server 102 may "ping" or otherwise attempt to locate vehicle 120 within data network 112, and will only send the date update when vehicle 120 establishes an appropriate data link 114 so that end-to-end communication may take place. In such embodiments, a flag may be set in the record corresponding to vehicle 120 in database 104 while vehicle 120 is in communication with system server 102. Of course other connection/communication schemes could be formulated in conjunction with other embodiments.

After the data update is provided to vehicle server 116, the relevant data is extracted, processed, and loaded into component 116 (step 214). In an exemplary embodiment, vehicle server 116 emulates a data loader device so that component 214 "thinks" that it is directly coupled with a data loader device. Such an emulation may be accomplished by, for example, formatting the data update in the same manner as a data update provided via diskette, and by emulating the same hardware/software signals provided by a conventional data loader.

After data is loaded into the relevant component 118, vehicle server 116 may process a "check status" operation with component 118 to determine whether the load was successful. The result of this check may be sent back to system server 102 (step 216) as appropriate so that the record corresponding to aircraft 120 in database 104 may be updated, so that the data update may be re-transmitted if appropriate, or so that any errors in the transmission process can be identified. Of course application 106 may process data updates for multiple vehicles (step 218), as appropriate.

Figure 3:
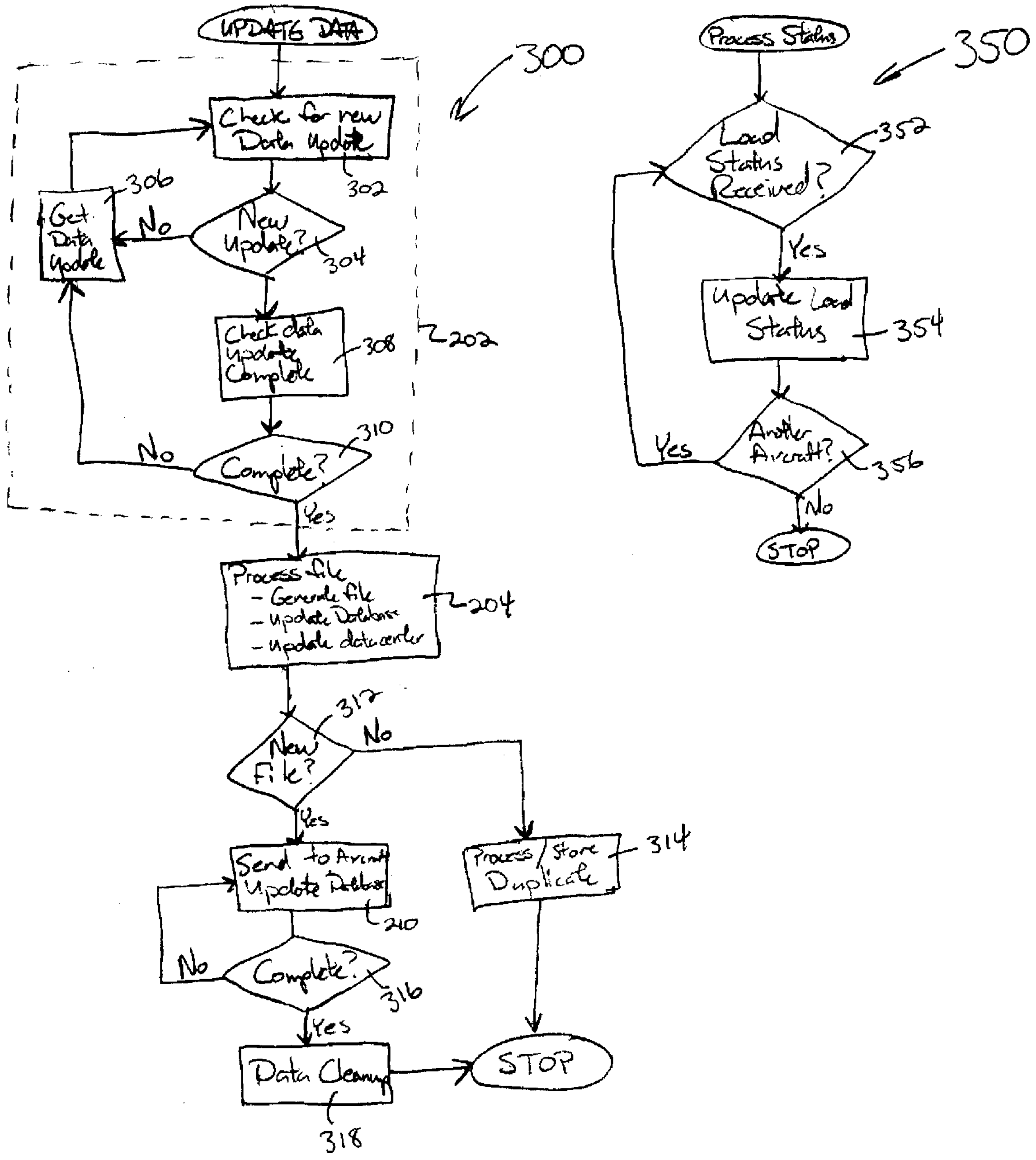
FIG. 3 is a flowchart of an exemplary method for operating a system server.

FIG. 3 is a more detailed flowchart showing exemplary processes for updating data and processing status that may be executed at system server 102 by administrative application 106. With reference now to FIG. 3, an exemplary process 300 for providing a data update to a vehicle 120 suitably includes the steps of obtaining data updates from a data source 101 (step 202), processing the data update file (step 204), transmitting data updates as appropriate (step 210), and cleaning up outdated update files (step 318).

As data update files are made available by data source 101, server 102 suitably polls the update files from source 101 at an appropriate time, or otherwise obtains suitable copies of the data update files (step 306). As the files are processed at system server 102 (step 308), a cyclic reduction code (CRC) or other checksum algorithm may be performed to verify the accuracy of the files, and to determine if the file is a duplicate of a file already received (step 304). Additionally or alternatively, data update files may be decompressed (using any conventional compression/decompression algorithm) or decrypted (using any symmetric, asymmetric or other encryption routine) as appropriate. If the file is a duplicate (step 304) or is otherwise corrupted (step 310), a new file may be requested (step 306).

Once the new data update file is received and verified, system server 102 suitably formats the data update into an appropriate data format that can be loaded into component 118 (step 204). In an exemplary embodiment, data updates are formatted into a serial number ("s.n.") format similar to that used in the production of diskette updates, using routines conventionally used for creating diskette copies. System server 102 may also make an entry in database 104 corresponding to the new data. Such an entry may contain the serial number of the data update (which may include unique identifiers), effective dates, version numbers, and the like. Additionally, system server 102 may send a status message to data source 101 notifying the data source that the data update was properly received, processed and stored by system server 102.

After the data update is processed, the data update file may be checked to determine whether the file is a duplicate of a data update previously processed (step 312). If so, the duplicate file may be stored or discarded, as appropriate (step 314). If not, the data update may be sent to relevant vehicles 120 as described above (step 210).

The process of sending data updates to relevant vehicles 120 (step 210) may be carried out manually at the request of an administrator/user, in response to a request from the vehicle 120 or automatically (e.g. update time is determined as a function of rules formulated in response to user inputs and/or data in database 104). In the latter case, data update files may be queued for transmission at an appropriate time. Transfer may take place via the file transfer protocol (FTP) or any other transfer scheme. Once a file is queued for transfer, an entry in database 104 corresponding to the recipient vehicle 120 may be flagged with a "Queued to Send" identifier. Of course, the actual text of the identifier could vary widely from implementation to implementation. Transmission of data updates may continue until updates have been sent to all relevant vehicles (step 316).

After data update files have been successfully sent to all relevant vehicles, outdated data update files may be purged from system server 102. Outdated files may be purged, moved, destroyed or otherwise processed according to any scheme, such as a scheme that is entered by an administrative user via interface program 108. In an exemplary embodiment, the two most recent versions of the data updates are maintained in database 104, and prior versions may be deleted from storage on system server 102. In various embodiments, system server 102 send a notification message to data source 101 when data update files are purged, moved, destroyed or otherwise 'cleaned up'.

With continued reference to FIG. 3, an exemplary process 350 for processing the status of a vehicle following a load operation suitably includes determining whether a load status is received (step 352) and updating the status information (step 354) for a number of aircraft or other vehicles (step 356). A daemon or other process running on system server 102 in conjunction with administrative program 106 and/or interface program 108 may execute such a process 350. In an exemplary embodiment, system server 102 suitably receives messages from vehicle servers 116 with load status information, as discussed more fully below in conjunction with FIG. 5. If the load was successful, the entry in database 104 corresponding to the relevant vehicle 120 may be updated with a "Send Successful" flag, as appropriate. If the load was not successful, a flag or alarm may be produced on administrative application 108 so that an administrator may troubleshoot sources of error. System server 102 may also send status information to data source 101 so that data source 101 may monitor the data update version executing on each component 118 in the field.

Figure 4:
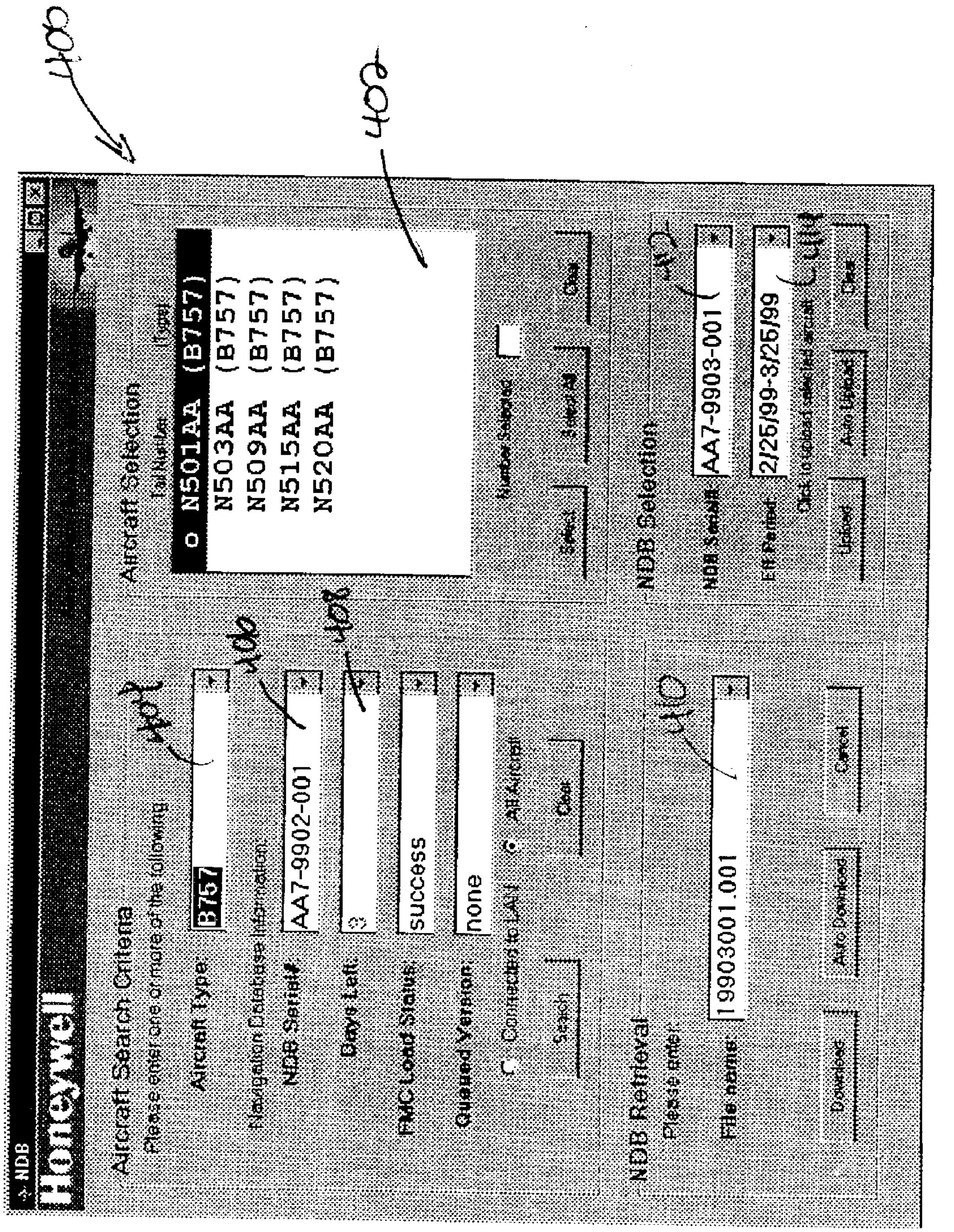
FIG. 4 is an exemplary user interface for an exemplary system server interface program.

FIG. 4 is an exemplary user interface that may be used in conjunction with an exemplary interface program 108. With reference now to FIG. 4, an exemplary user interface 400 suitably includes data fields for viewing information maintained in database 102. Data fields may correspond to, for example, particular aircraft (shown organized by FAA tail number in window 402 in FIG. 4), aircraft type 404, data update serial number 406, days left before data expiration 408, data update file name 410, data update serial number 412, data update effective period 414, or the like. As can be appreciated, administrative personnel/users may use interface 400 to view information stored in database 104 relating to data updates, particular vehicles, fleet information, or the like. Various windows may also allow support personnel to set up automatic processes for providing data updates to vehicles, to request data updates from data source 101, or to manually initiate transmission of a data update to a particular vehicle 120. Such update procedures could be initiated immediately or queued for a later time, as appropriate. In an exemplary embodiment, data update information stored in database 104 suitably includes an update identifier (e.g. serial number), an update version, and an effective date. Fleet information may include tail/license numbers or other vehicle identifiers, vehicle type, current data update identifier, current data update version, days left until expiration of current update, queued data update version, queued upload status, component load status and/or a flag to determine whether the vehicle is presently connected to network 112 (e.g. via data link 114). Of course the particular database fields may vary widely from implementation to implementation, and the exemplary database fields described herein are for illustrative purposes only.

Figure 5:
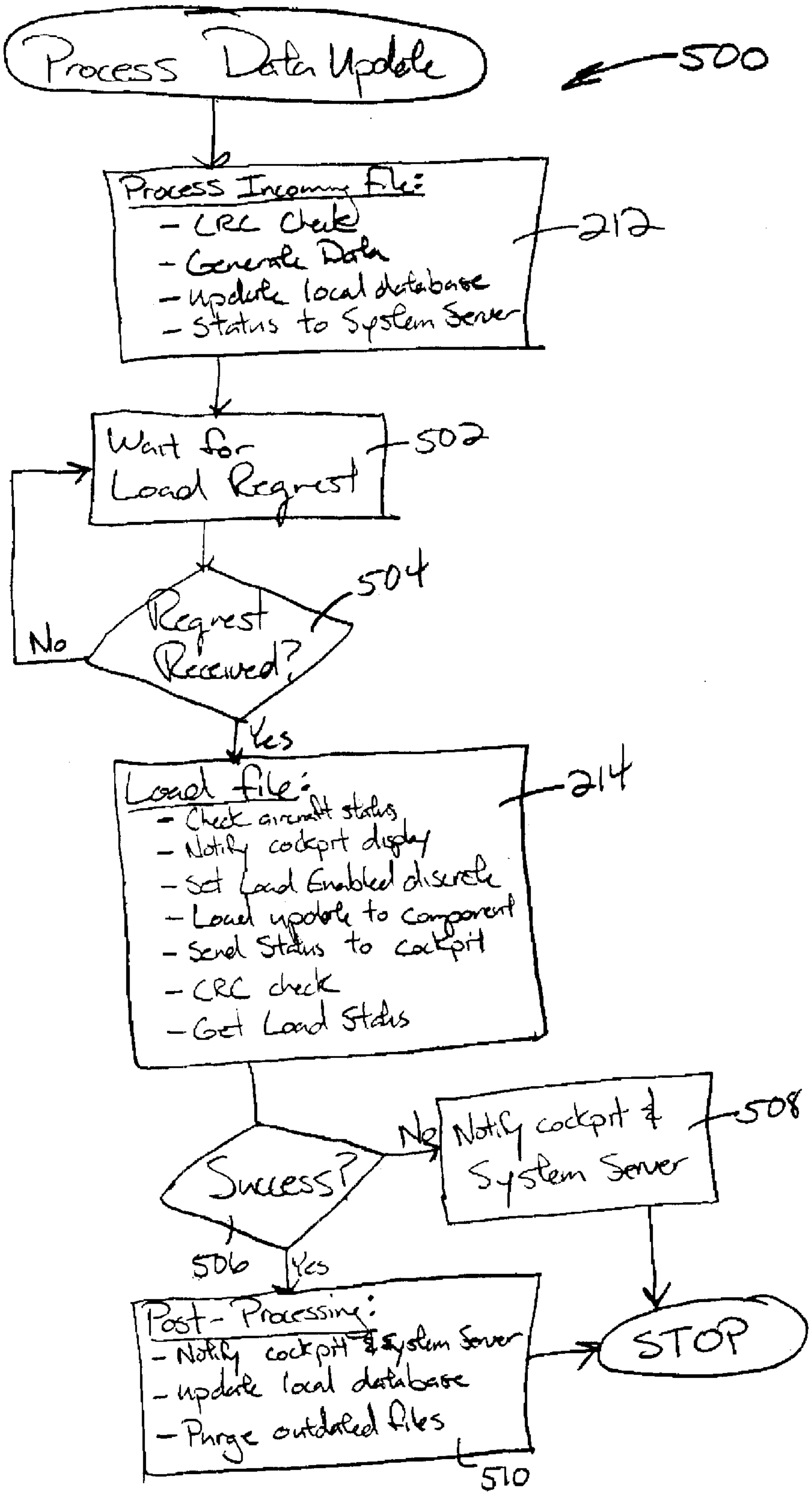
FIG. 5 is a flowchart of an exemplary method for operating a vehicle server.

FIG. 5 is a flowchart of an exemplary process that may be executed at vehicle server 116. With reference now to FIG. 5, process 500 suitably includes processing incoming data update files (step 212), loading the data update file into a component (step 214), and providing post-processing notification back to system server 102 (steps 508 or 510). Step 212 of processing incoming data files suitably includes retrieving the data update file via data link 114 and performing a cyclic reduction code (CRC) check to verify the integrity of the data update file and to ensure that the file was not corrupted during transmission. Results of the CRC check may be compared against a CRC provided by data source 101 and/or the CRC previously computed at system server 102. If the data update is properly received and the version is newer than the version currently loaded in component 118, a data load file suitable for loading into component 118 may be generated. In an exemplary embodiment, the data load file is a serial number "s.n." file such as that described above. In such embodiments, the "s.n." file is formatted similar to a file that would have been delivered via diskette such that component 118 may process the file just as if the file had been received via a hardware data loader. Various embodiments of vehicle server 116 also include a database for tracking data update information. In such embodiments, the data update serial number/identifier, effective date and/or version number may be stored in the database.

When the data update file is received and ready for loading, vehicle server 116 suitably waits for a load request from a cockpit display (steps 502 and 504) before proceeding. The load request may come from a manual request from a pilot or mechanic to load the data file, or from any other source. When the load request is received, vehicle server 116 suitably initiates the load process by checking the status of the aircraft (so that loads to not accidentally take place during flight, for example), by notifying a cockpit display that the load is initiating, and by setting a "load enabled" discrete/flag in component 118 (provided that component 118 has such a flag), as appropriate. As the update is being loaded into component 118, vehicle server 116 may send status updates to a cockpit display to allow pilots and maintenance personnel to monitor the status of the load. When the load is complete, a CRC check (such as a CRC routine set forth in the ARINC 615 standard) is executed by component 118 or vehicle server 116, as appropriate, to verify that the data update was properly loaded. Many embodiments of component 118 (such as most flight management computers/systems) further provide a "load status" flag or other indicator to provide feedback on the results of the load, and vehicle server 116 suitably checks this flag when available and appropriate.

If the load status flag or CRC check indicate that the load was unsuccessful for any reason, then vehicle server 116 notifies the cockpit display and system server 102 of the error (step 508). A new data update file may then be sent, a technician may be dispatched to troubleshoot the problem, or the problem may be otherwise resolved as appropriate. If the load is successful, vehicle server 116 suitably performs post-load processing (step 510) as appropriate. Post-load processing may include notifying the cockpit display of the successful load and updating local database (if such a database is available) to indicate the user identification, date loaded, and load status. Vehicle server 116 may also notify system server 102 of the successful load by sending information such as the data update identifier, version number, user identification, date loaded and/or load status of the load. Outdated data update files may also be deleted, moved or otherwise processed as appropriate.

Of course, process 500 shown in FIG. 5 is an exemplary process, and a practical method for operating vehicle server 116 may vary from that shown herein. For example, manual processing may be enabled to allow maintenance personnel on vehicle 120 to manually load the data update file as appropriate and desired. Additional functionality may vary from embodiment to embodiment.

Figure 6:
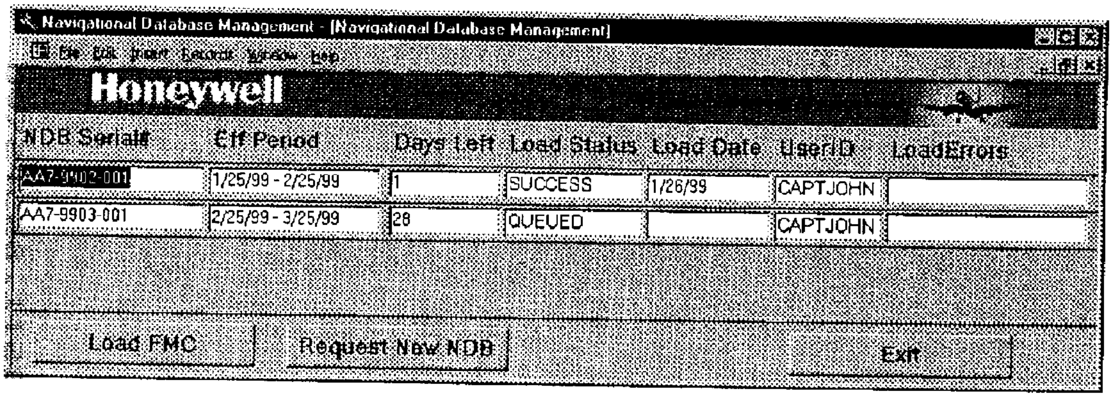
FIG. 6 is an exemplary user interface for a vehicle server administration program.

FIG. 6 is an exemplary user interface suitable for use in administering data updates handled by vehicle server 116. With reference now to FIG. 6, an exemplary interface 600 suitably includes a display of data update serial number/identifier, effective period, days left before expiration, load status, load date, the user identification of the person who provided the load enable signal to allow the load to proceed, and any load errors that may have occurred. Of course other data fields could be used in alternate embodiments. The interface 600 shown in FIG. 6 also includes buttons 602 and 604 to manually initiate loading the data update into component 118 or to request a new data update from system server 102, respectively. Again, the interface 600 used in a practical implementation may vary significantly from embodiment to embodiment.

It will therefore be appreciated that the shortcomings exhibited in prior art systems for transporting data updates to vehicle components have been overcome by the systems and methods described herein. In particular, various aspects of the systems and methods described herein suitably allow automatic downloading of data updates from a data source so that customers have a standardized technique for obtaining files. The administrative burden commonly associated with creation and distribution of floppy diskettes may be substantially reduced through electronic distribution to the vehicle, and vehicle downtime may be reduced through the use of fast wireless data transfers. Flexibility as to when and where the data update load occurs is greatly improved through the use of an interface program and a database, and data providers may be electronically kept abreast of the status of component data updates, thus allowing enhanced safety monitoring as well as fair and efficient billing techniques. Other beneficial aspects may be realized through other implementations of the various embodiments.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalence, rather than by the examples given above. No element described herein is necessary to the practice of the invention unless expressly described as "critical" or "essential". The various steps in the following method claims may be practiced in any order, and are not required to be practiced in the order recited below.

What is claimed is:

1. A method of providing a data update to a vehicle, the method comprising the steps of:

obtaining and storing said data update at a system server;

forwarding said data update from said system server to a vehicle server via a data connection;

loading said data update from said vehicle server into a component at said vehicle; and verifying from said vehicle server to said system server via said data connection that said loading step completed successfully.

2. The method of claim 1 wherein said data connection comprises a wireless data connection.

3. The method of claim 2 wherein said wireless data connection comprises a gatelink connection.

4. The method of claim 2 further comprising the step of obtaining rules for distributing said data update from a user prior to said step of obtaining said data update.

5. The method of claim 4 further comprising the step of maintaining a database in communication with said system server, wherein said database comprises data about particular vehicles.

6. The method of claim 5 further comprising the step of querying said database to determine when said data update is sent to said vehicle as a function of said rules.

7. A digital storage medium having computer-executable instructions stored thereon, wherein said computer-executable instructions are operable to execute the method of claim 2.

8. A digital storage medium having computer-executable instructions stored thereon, wherein said computer-executable instructions are operable to execute the method of claim 6.

9. A method of providing a data update to a vehicle, the method comprising the steps of:

receiving said data update at a system server;

transmitting said data update to a vehicle server via a data connection at a pre-determined time; and receiving a confirmation from said vehicle server via said data connection when said data update is successfully loaded.

10. The method of claim 9 further comprising the step of obtaining user inputs for said pre-determined time.

11. The method of claim 10 further comprising storing said pre-determined time in a database in association with an identifier for said vehicle.

12. The method of claim 9 wherein said data connection comprises a wireless data connection.

13. A digital storage medium having computer-executable instructions stored thereon, wherein said computer-executable instructions are operable to execute the method of claim 9.

14. A digital storage medium having computer-executable instructions stored thereon, wherein said computer-executable instructions are operable to execute the method of claim 11.

15. A digital storage medium having computer-executable instructions stored thereon, wherein said computer-executable instructions are operable to execute the method of claim 12.

* * * * *